United States Patent
Huang et al.

(10) Patent No.: US 12,004,640 B2
(45) Date of Patent: Jun. 11, 2024

(54) MANUAL LIFTING-LOWERING COMPUTER TABLE

(71) Applicant: Gangwei Huang, Guangdong (CN)

(72) Inventors: Jianming Huang, Guangdong (CN); Gangwei Huang, Guangdong (CN)

(73) Assignee: Gangwei Huang, Guangdong (CN)

( * ) Notice: Subject to any disclaimer, the term of this patent is extended or adjusted under 35 U.S.C. 154(b) by 20 days.

(21) Appl. No.: 17/960,824

(22) Filed: Oct. 6, 2022

(65) Prior Publication Data

US 2023/0363529 A1 Nov. 16, 2023

(30) Foreign Application Priority Data

May 11, 2022 (CN) .......................... 202221123848.X (51) Int. Cl.
*A47B 21/02* (2006.01)
*A47B 9/20* (2006.01)
*A47B 13/08* (2006.01)
*A47B 21/04* (2006.01)

(52) U.S. Cl.
CPC ................ *A47B 21/02* (2013.01); *A47B 9/20* (2013.01); *A47B 13/088* (2013.01); *A47B 21/04* (2013.01)

(58) Field of Classification Search
CPC ........ A47B 21/02; A47B 21/04; A47B 13/088
USPC ...................................... 108/96, 145, 147.11
See application file for complete search history.

(56) References Cited

U.S. PATENT DOCUMENTS

| | | | | | |
|---|---|---|---|---|---|
| 5,823,120 | A | * | 10/1998 | Holmquist | A47B 9/02 108/147 |
| 6,038,986 | A | * | 3/2000 | Ransil | A47B 17/02 108/146 |
| 7,637,468 | B2 | * | 12/2009 | Huang | F16M 11/10 248/370 |
| 8,015,638 | B2 | * | 9/2011 | Shimada | A47C 19/045 108/147 |
| 8,065,966 | B1 | * | 11/2011 | Bacon | A47B 9/16 108/147 |
| 10,893,748 | B1 | * | 1/2021 | Poniatowski | A47B 21/03 |
| 11,337,516 | B1 | * | 5/2022 | You | A47B 9/16 |
| 2007/0034125 | A1 | * | 2/2007 | Lo | B66F 7/0608 108/20 |
| 2019/0110588 | A1 | * | 4/2019 | Wong | A47B 9/02 |
| 2020/0029683 | A1 | * | 1/2020 | Xiang | A47B 9/16 |
| 2020/0029685 | A1 | * | 1/2020 | Du | A47B 21/02 |
| 2020/0107633 | A1 | * | 4/2020 | Kang | H02J 50/005 |
| 2020/0196748 | A1 | * | 6/2020 | Lu | A47B 9/16 |

(Continued)

*Primary Examiner* — Jose V Chen
(74) *Attorney, Agent, or Firm* — JCIPRNET (57) ABSTRACT

A manual lifting-lowering computer table includes a table board and a keyboard board arranged under the table board. Sliding seats are arranged on both sides of a bottom surface of the table board, a group of bases parallel to the sliding seat are arranged under the table board, and a first supporting foot and a second supporting foot are arranged on the bases. A middle part of the first supporting foot and a middle part of the second supporting foot are hinged through a connecting shaft, and one ends of the first supporting foot and the second supporting foot away from the bases are arranged on the sliding seats respectively. The first supporting foot is provided with a supporting telescopic device. An upper end of the supporting telescopic device is hinged on the connecting seat arranged at one end of the sliding seat adjacent to the keyboard board.

8 Claims, 11 Drawing Sheets

(56) References Cited

U.S. PATENT DOCUMENTS

| | | | |
|---|---|---|---|
| 2020/0221864 A1* | 7/2020 | Ergun | A47B 9/02 |
| 2020/0245756 A1* | 8/2020 | Huang | A47B 9/02 |
| 2022/0295982 A1* | 9/2022 | Zheng | A47B 9/10 |
| 2022/0330692 A1* | 10/2022 | Tao | A47B 9/16 |
| 2022/0354246 A1* | 11/2022 | Wang | A47B 21/0314 |
| 2023/0072671 A1* | 3/2023 | Yuan | B66F 7/065 |
| 2023/0337814 A1* | 10/2023 | Lu | A47B 97/00 |

* cited by examiner

MANUAL LIFTING-LOWERING COMPUTER TABLE

CROSS-REFERENCE TO RELATED APPLICATION

This application claims the priority benefit of China application serial no. 202221123848.X, filed on May 11, 2022. The entirety of the above-mentioned patent application is hereby incorporated by reference herein and made a part of this specification.

BACKGROUND

Technical Field

The present invention relates to the field of furniture, in particular to a work table placed on a desktop that can independently lift and lower a computer table board.

Description of Related Art

Sitting for long periods of time can cause a variety of diseases, but people have to do so due to the limitation of the work environment when working. Most desks cannot be adjusted in height after placing the computer, and there is no lifting-lowering mechanism of the computer table, which is inconvenient for users of different heights to operate.

An existing lifting-lowering work table is used to carry the computer. The computer monitor is placed on the table board when in use, and the display rises and falls with the lifting and lowering of the table board. Due to the limited lifting-lowering height of the tabletop, it is often necessary to raise the height of the display, whilst this method of putting a pad on the bottom of the display to lift the display is troublesome and not safe, and such a structure is more complicated, which makes the lifting operation inconvenient.

SUMMARY

In order to solve the problems in the prior art, the object of the present invention is to provide a manual lifting-lowering computer table, which realizes the controllable height and the stable gravity center of the computer table, and thereby achieves the convenient and safe use.

To achieve the above object, the present invention adopts the following technical solutions.

A manual lifting-lowering computer table includes a table board and a keyboard board. The keyboard board is arranged under the table board. Sliding seats are arranged on both sides of a bottom surface of the table board, a group of bases parallel to the sliding seat are arranged under the table board, and a first supporting foot and a second supporting foot are arranged on the bases. A middle part of the first supporting foot and the middle part of the second supporting foot are hinged through a connecting shaft, and one ends of the first supporting foot and the second supporting foot away from the bases are arranged on the sliding seats respectively.

The first supporting foot is provided with a supporting telescopic device. An upper end of the supporting telescopic device is hinged on the connecting seat, and the connecting seat is arranged at one end of the sliding seat adjacent to the keyboard board; and a lower end of the supporting telescopic device is arranged on an upper part of the first supporting foot.

The hinge joint between the lower end of the supporting telescopic device and the first supporting foot is arranged outside of the first supporting foot, and the hinge joint of the lower end of the supporting telescopic device is located between the first supporting foot and the second supporting foot; and a hinge part of the lower end of the supporting telescopic device and the first supporting foot is located above the connecting shaft.

The side wall of the sliding seat is provided with a handle connecting plate extending downward, an outer side of the sliding seat is provided with a handle, and the top of the handle is provided with a handle shaft extending laterally inward, wherein the handle shaft is penetrated in the handle connecting plate. One end of the handle shaft away from the handle is provided with a handle shaft support, wherein a top portion of the handle shaft support is provided with a driving strip, and the top of the handle shaft support is hinged with an end portion of the driving strip.

A hinge axis of the handle shaft support and the driving strip is parallel to a connecting axis of the handle shaft and the handle shaft support; one end of the driving strip away from the handle shaft support is provided with a bent clamping piece, and the bent clamping piece is provided with an upper connecting hole and a lower connecting hole that are longitudinally arranged upper and lower connecting holes.

The lower connecting hole of the bent clamping piece is hinged with the driving strip, the upper connecting hole of the bent clamping piece is hinged to an abutment seat, and a bending part of the bent clamping piece is arranged in the positioning groove of a clamping block.

Further, the supporting telescopic device can be an air pressure rod, a gas spring or a spring damper; a top end of the second supporting foot is provided with the clamping block, wherein the clamping block is arranged in the sliding seat, the clamping block is provided with a bending connection part that is bent outwards, and the bending connection part of the clamping block is hinged with the top end of the second supporting foot.

A side of the clamping block away from the bending connection part is provided with the positioning groove extending inward, wherein the positioning groove is arranged in the sliding seat.

An inner side wall of the sliding seat is provided with a baffle, the clamping block is arranged adjacent to the baffle, and the clamping block is slidably arranged on the baffle, and the baffle is a steel ball guide plate.

Further, a hinge joint between a bottom end of the supporting telescopic device and the first supporting foot is arranged above the connecting shaft; the first support foot is provided with a hinge piece, the hinge piece is matched with the connecting shaft, and the first supporting foot and the second supporting foot on a same side are connected by the connecting shaft.

A horizontal supporting frame is arranged between a group of first supporting feet on left and right sides of the table board, wherein the horizontal supporting frame is located below the hinge piece; the length of the connecting shaft is greater than the width of the supporting telescopic device.

Further, an outer side of the first supporting foot is provided with the supporting telescopic device.

An upper support frame is arranged between the sliding seats on both sides of the table board, and the sliding seats on both sides of the table board are connected by the upper support frame.

Further, an inner side of the sliding seat adjacent to one end of the keyboard board is provided with a bracket, wherein the bracket is L-shaped, a longitudinal surface of the bracket is arranged on an outer wall of the inner side of the sliding seat, and a lateral surface of the bracket is fixedly connected to a bottom surface of the keyboard board.

Further, the group of bases are arranged under the table board, the middle part of the first supporting foot and the middle part of the second supporting foot are hinged through the connecting shaft, and the base is provided with the first supporting foot and the second supporting foot that are hingedly-connected.

An inner side of the end of the sliding seat adjacent to the keyboard board is provided with a downwardly extending support connection plate, a top end of the first supporting foot is hinged with the support connection plate, and a bottom end of the first supporting foot is arranged on the base.

Further, a bottom end of the first supporting foot is provided with a hinged bending slider, and the bending slider is arranged on the base; an inner side of the base away from the keyboard board is provided with a chute, and a bottom portion of the chute of the base is provided with a guide rail plate, and a bottom portion of the bending slider is provided with a bending slider part that is bent outward and extends into the chute of the base and is accommodated in the base, wherein the bending slider part is Γ-shaped, and the bending slider part of the bending slider is embedded in the chute.

A bottom surface of a bending part of the bending slider part is arranged adjacent to a top end of the guide rail plate, and the bending slider part is slidably arranged in the chute.

Further, a rear end of an outer side of the base is provided with a plug-in port, a bottom end of the second supporting foot is provided with a hinged plug-in board, the plug-in board is L-shaped, and the inwardly bent L-shaped extension section of the plug-in board is provided with a bottom baffle, wherein the bottom baffle of the L-shaped extension section of the plug-in board is arranged in the plug-in port, the bottom baffle of the L-shaped extension section of the plug-in board is embedded into the plug-in port, and the bottom baffle plate bent at a bottom end of the plug-in board is arranged adjacent to a bottom inner wall of the base.

In the present invention, the computer table is equipped with a lifting-lowering mechanism, which can make the height of the computer table can be raised or lowered. The computer table can be lowered to adapt to the sitting posture, and also can be raised to adapt to the standing posture, or can be actively raised and lowered according to people's own needs to alternately work in a sitting or standing position, which thereby reduce the occurrence of diseases of people's waist, neck, shoulder and back, and thereby is beneficial to improve work efficiency. Moreover, the lifting-lowering computer table of the present invention can be folded, which is convenient for storage and transportation.

The computer table of the present invention can be made into various sizes, for example, the width of the table board is 80 cm. The present invention can adjust (lengthen) the middle support frame (connecting rod) and the connecting parts to enable the width of the table board can be 1.2 meters and 1.3 meters or 90 cm, or can reduce (shorten) the width of the table board to be 70 cm, the corresponding table board length can also be adjusted as needed.

DESCRIPTION OF THE EMBODIMENTS

Figure 5:
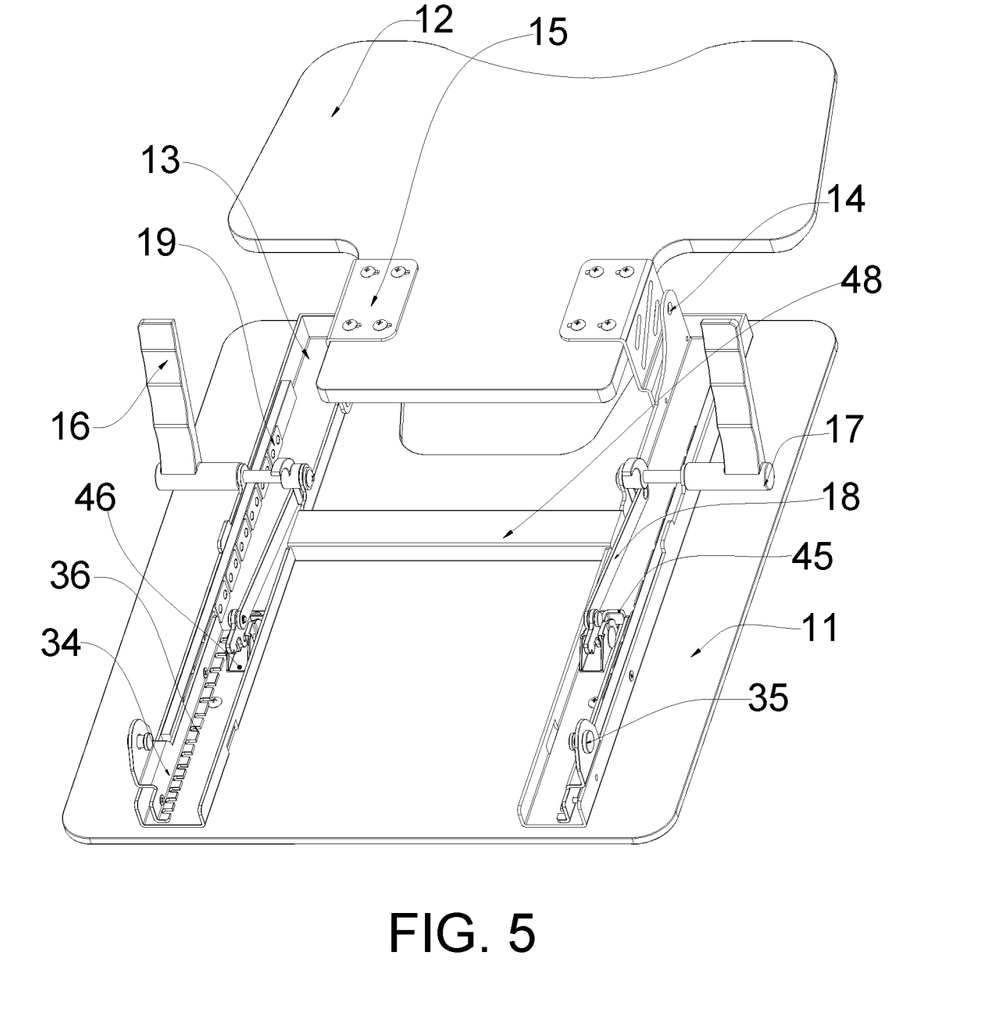
FIG. 5 is a schematic bottom view of the table part of the embodiment.
Figure 6:
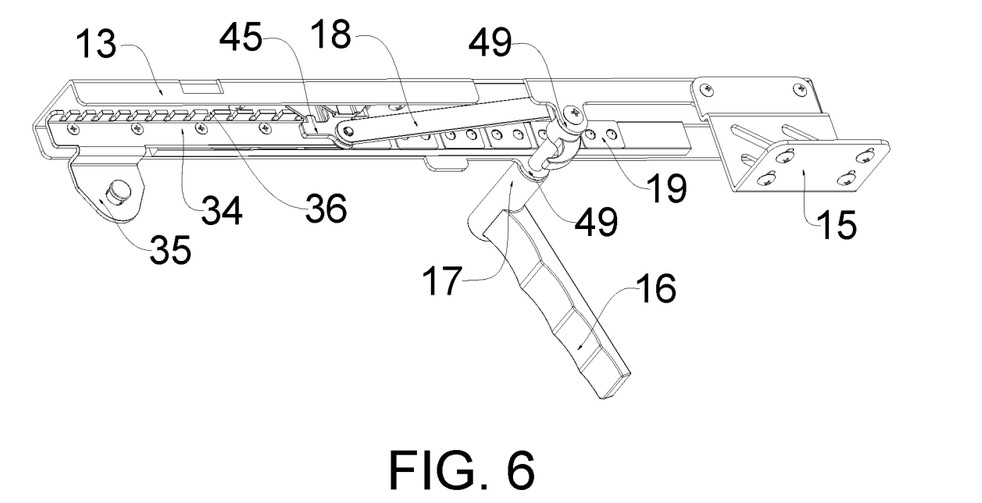
FIG. 6 is a stereo diagram of the sliding seat part of the embodiment.
Figure 7:
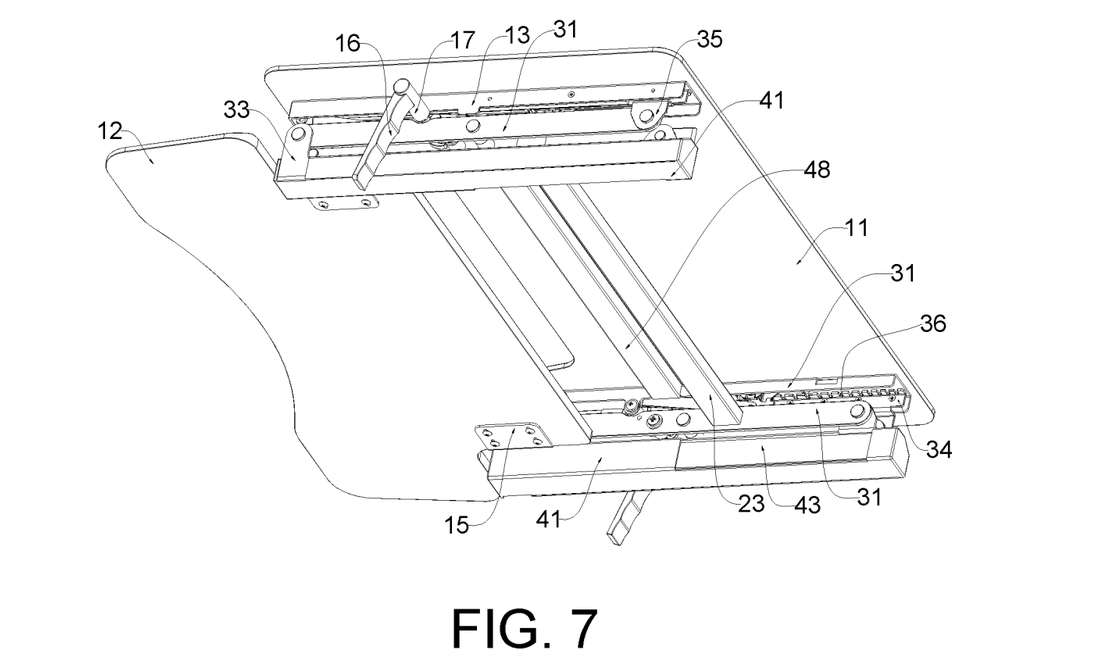
FIG. 7 is a folded state diagram of the embodiment.

Referring to the annexed figures, the manual lifting-lowering computer table of the present invention comprises a table board 11 and a keyboard board 12. The keyboard board 12 is arranged under the table board 11. Sliding seats 13 are arranged on both sides of the bottom surface of the table board 11, and an upper support frame 48 is provided between the sliding seats 13 on both sides of the table board 11, as illustrated in FIG. 5. In other words, the sliding seats 13 on both sides of the table board 11 are connected by the upper support frame 48 (frame).

A group of bases 41 parallel to the sliding seat 13 are arranged under the table board 11, a first supporting foot 21 and a second supporting foot 31 are arranged on the bases 41, and the middle part of the first supporting foot 21 and the middle part of the second supporting foot 31 are connected by the shaft 32, and one ends of the first supporting foot 21 and the second supporting foot 31 away from the base 41 are arranged on the sliding seats 13 respectively.

The first supporting foot 21 is provided with a supporting telescopic device 22 (air pressure rod, gas spring, spring damper). Further, the outer side of the first supporting foot 21 is provided with a supporting telescopic device 22, the upper end of the support telescopic device 22 is hinged on the connecting seat 25, and the connecting seat 25 is arranged at one end of the sliding seat 13 close to the keyboard board 12. The lower end is arranged on the upper part of the first supporting foot 21, and the hinge part between the lower end of the supporting telescopic device 22 and the first supporting foot 21 is located above the connecting shaft 32.

Further, the hinge joint 60 between the supporting telescopic device 22 (lower end) and the first supporting foot 21 is located outside the first supporting foot 21, and the hinge joint 60 of the lower end of the supporting telescopic device 22 is located between the first supporting foot 21 and the second supporting foot 31. The hinge joint 60 between the supporting telescopic device 22 and the first supporting foot 21 is spaced from the connecting shaft 32 by a distance, and the length of the connecting shaft 32 is greater than the width of the supporting telescopic device 22.

Figure 8:
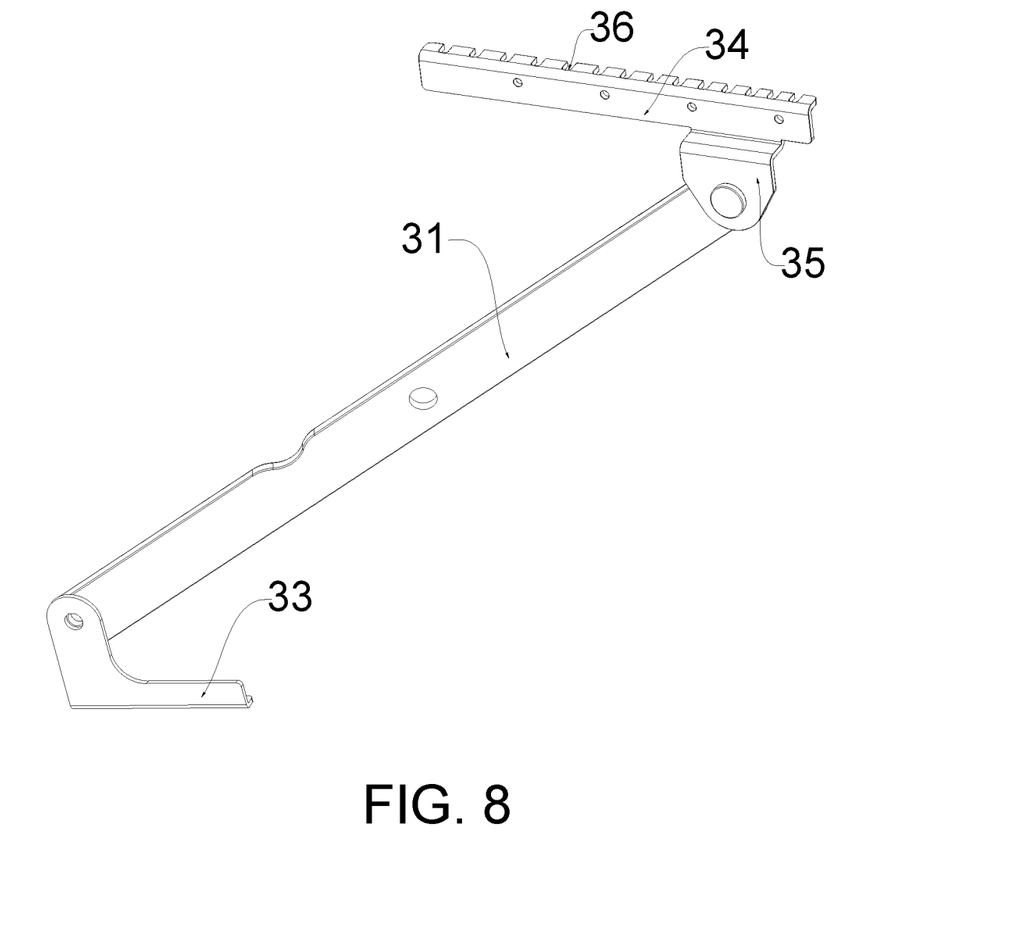
FIG. 8 is a schematic diagram of a second supporting foot portion of the embodiment.
Figure 9:
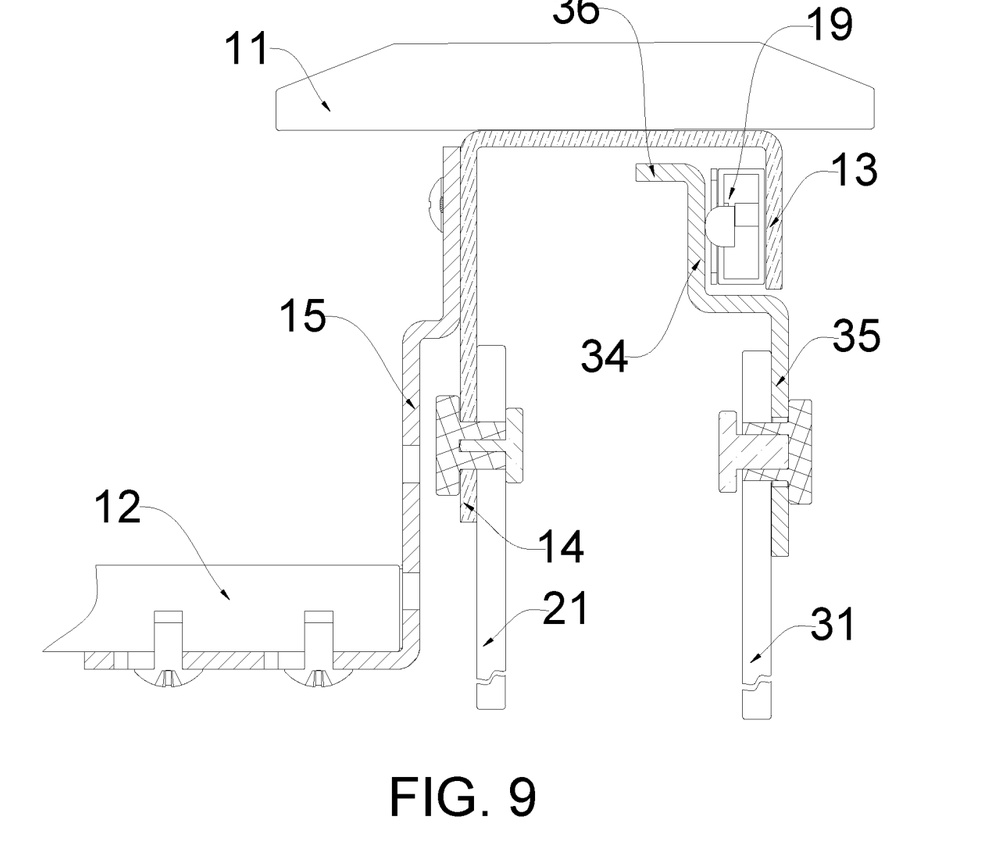
FIG. 9 is the structural schematic diagram of the sliding seat part of the embodiment.
Figure 10:
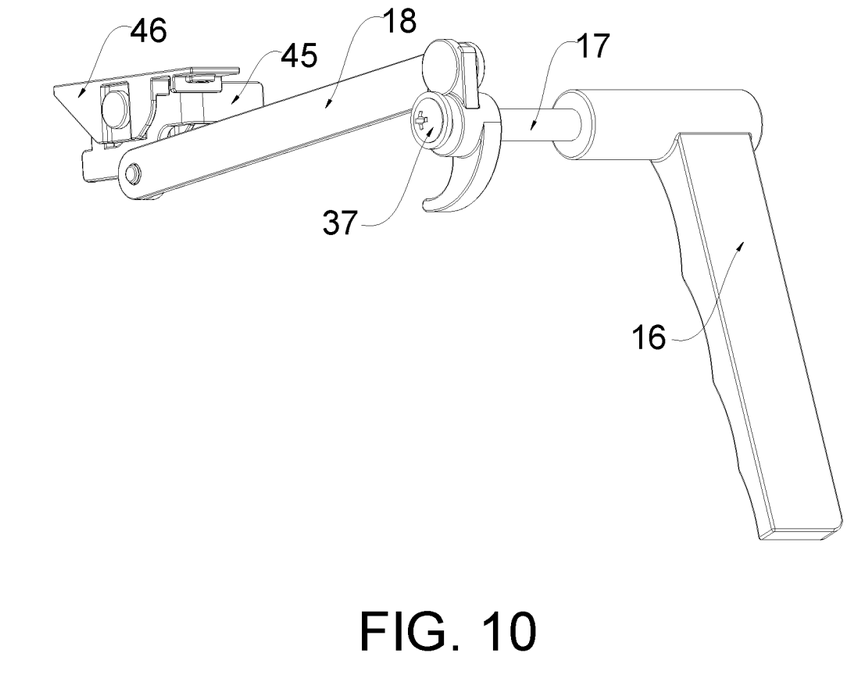
FIG. 10 is the structural representation of the handle part of the embodiment.

The top end of the second supporting foot 31 is provided with a clamping block 34. The clamping block 34 is arranged in the sliding seat 13, the clamping block 34 is provided with a bending connection part 35 that is bent outwards, and the bending connection part 35 of the clamping block 34 is hinged with the top end of the second supporting foot 31. The clamping block 34 bent to the inner side of the sliding seat 13 is provided with a positioning groove 36, as shown in FIG. 8. The inner side wall of the sliding seat 13 is provided with a baffle 19 (steel ball guide plate), and a clamping block 34 is arranged adjacent to the baffle 19, and the clamping block 34 is slidably arranged on the baffle 19, as shown in FIG. 9.

The side wall of the sliding seat 13 is provided with a handle connecting plate 49 extending downward. Preferably, the side walls on both sides of the sliding seat 13 are provided with a handle connecting plate 49 extending downward, and a group of handle connecting plates 49 on both sides are mutually symmetry. The outer side of the sliding seat 13 is provided with a handle 16, the top end of the handle 16 is provided with a handle shaft 17 extending laterally inward, the handle shaft 17 is inserted in the handle connecting plate 49, and the end of the handle shaft 17 away from the handle 16 is provided with a handle shaft support 37, and the top portion of the handle shaft support 37 is provided with the driving strip 18, and the top portion of the handle shaft support 37 is hinged with the end of the driving strip 18.

Further, the hinge axis of the handle shaft support 37 and the driving strip 18 is parallel to the connecting axis of the handle shaft 17 and the handle shaft support 37, as shown by the sliding seat 13 in the figure. In other words, the hinge shaft of the handle shaft support 37 and the driving strip 18 is longitudinally spaced parallel to the connecting shaft of the handle shaft support 37 and the handle shaft 17.

Further, one end of the driving strip 18 away from the handle shaft support 37 is provided with a bent clamping piece 45, and the bent clamping piece 45 is provided with two longitudinally arranged (upper and lower) connecting holes 71 and 72. The lower connecting hole 72 of the bent clamping piece 45 is hinged with the driving strip 18, the upper connecting hole 71 of the bent clamping piece 45 is hinged to the abutment seat 46, and the bending part 47 (direction) of the bent clamping piece 45 is arranged in the positioning groove 36 of the clamping block 34. The handle 16 drives the bent clamping piece 45 to move up and down (swing) in the positioning groove 36 through the driving strip 18. By unlocking and locking the bent clamping piece 45 in the positioning groove 36, the length of the supporting telescopic device 22 is adjusted to adjust the length of the supporting telescopic device 22 so as to position the lifting-lowering height of the board 11.

Further, the inner side of the sliding seat 13 close to one end of the keyboard board 12 is provided with a bracket 15. The bracket 15 is L-shaped, the longitudinal surface of the bracket 15 is arranged on the outer wall of the inner side of the sliding seat 13, and the lateral surface of the bracket 15 is fixedly connected to the bottom surface of the keyboard board 12. In other words, the lateral surface of the bracket 15 is arranged on the bottom surface of the keyboard board 12, as shown in FIG. 9. The bracket 15 is arranged on the inner side of the sliding seat 13 to facilitate the folding (folding) of the entire computer table.

A group of bases 41 are arranged below the table boar 11, the middle part of the first supporting foot 21 and the middle part of the second supporting foot 31 are hinged through a connecting shaft 32, and the base 41 is provided with a first supporting foot 21 and a second supporting foot 31 that are hingedly-connected. Further, the inner side of one end of the sliding seat 13 close to the keyboard board 12 is provided with a downwardly extending support connection plate 14, the top end of the first supporting foot 21 is hinged with the support connection plate 14 (bulging down), and the bottom end of the first supporting foot is arranged on the base.

Figure 11:
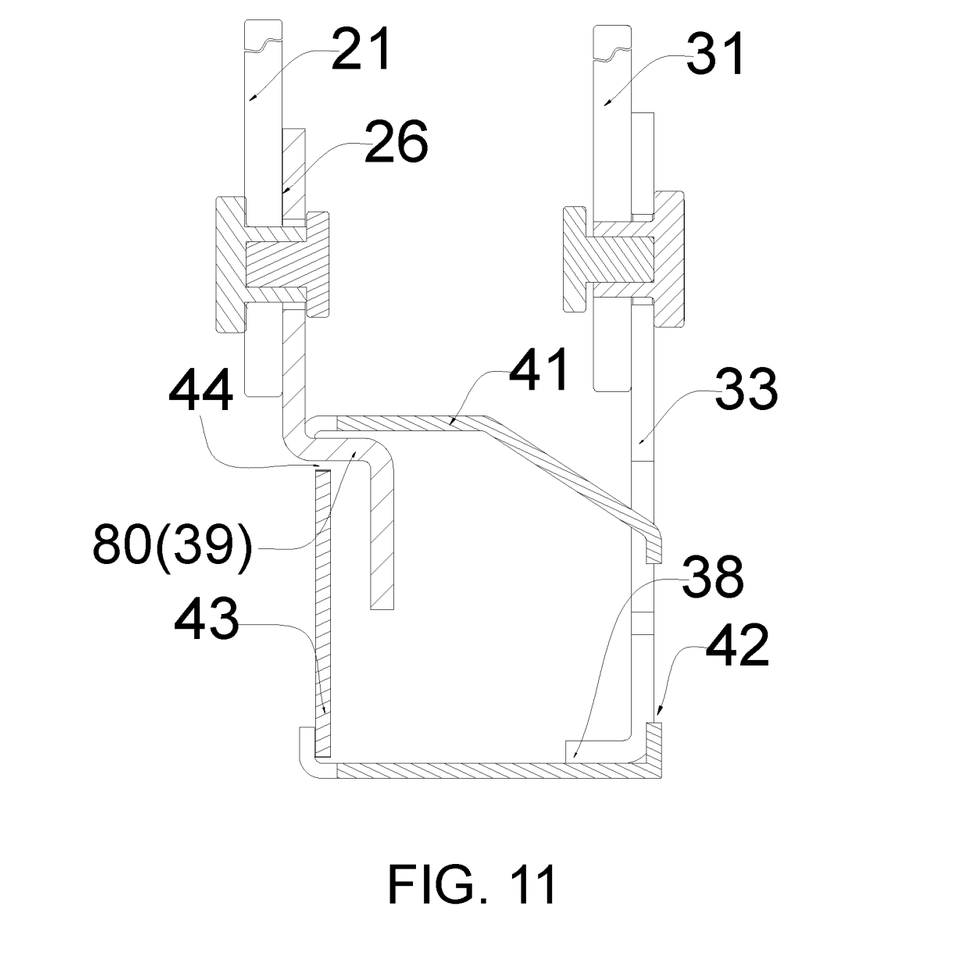
FIG. 11 is a schematic structural diagram of the base part of the embodiment.
Figure 12:
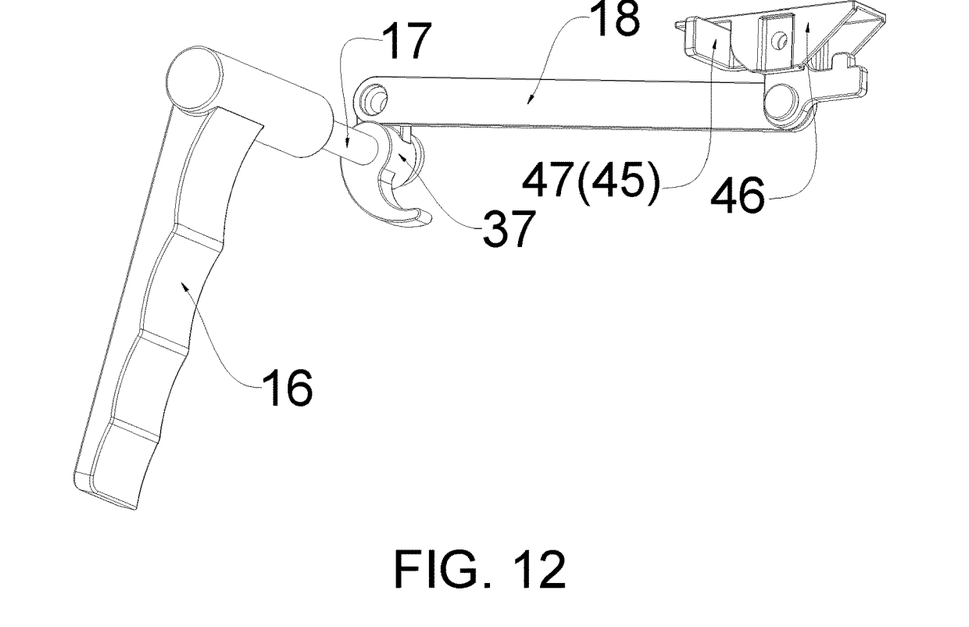
FIG. 12 is a perspective view of the handle part of the embodiment.
Figure 13:
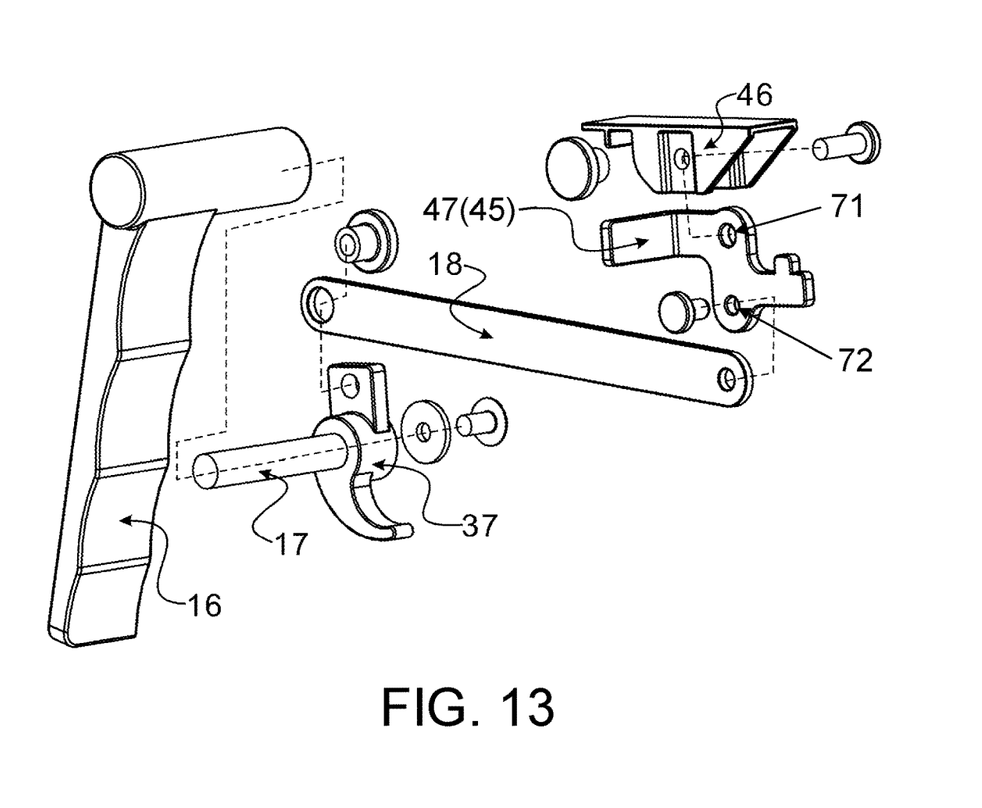
FIG. 13 is an assembly schematic view of the handle part of the embodiment.

Further, the bottom end of the first supporting foot 21 is provided with a hinged bending slider 26, and the bending slider 26 is arranged on the base 41, as shown in FIG. 11. The end (the forwarding end) of the inner side of the base 41 away from the keyboard board 12 is provided with a chute, and the bottom portion of the chute 44 (the opening) of the base 41 is provided with a guide rail plate 43, and the bottom portion of the bending slider 26 are provided with a chute 44 that is bent outward and extends into the base 41 and with a bending slider part 39 accommodated in the base 41. The bending slider part 39 is Γ-shaped, and the bending slider part 39 of the bending slider 26 is embedded in the chute.

In other words, a guide rail plate 43 is provided at the bottom portion of the chute 44 inside the base 41, the guide rail plate 43 is welded to the base 41, and the guide rail plate 43 and the opening inside the base 41 form a chute 44, which is equivalent to that the upper part of the inner side of the base 41 is provided with a chute 44, the bottom surface of the bending part 80 of the bending slider part 39 is arranged close to the top end of the guide rail plate 43, and the bending slider part 39 is slidably arranged in the chute 44.

Figure 1:
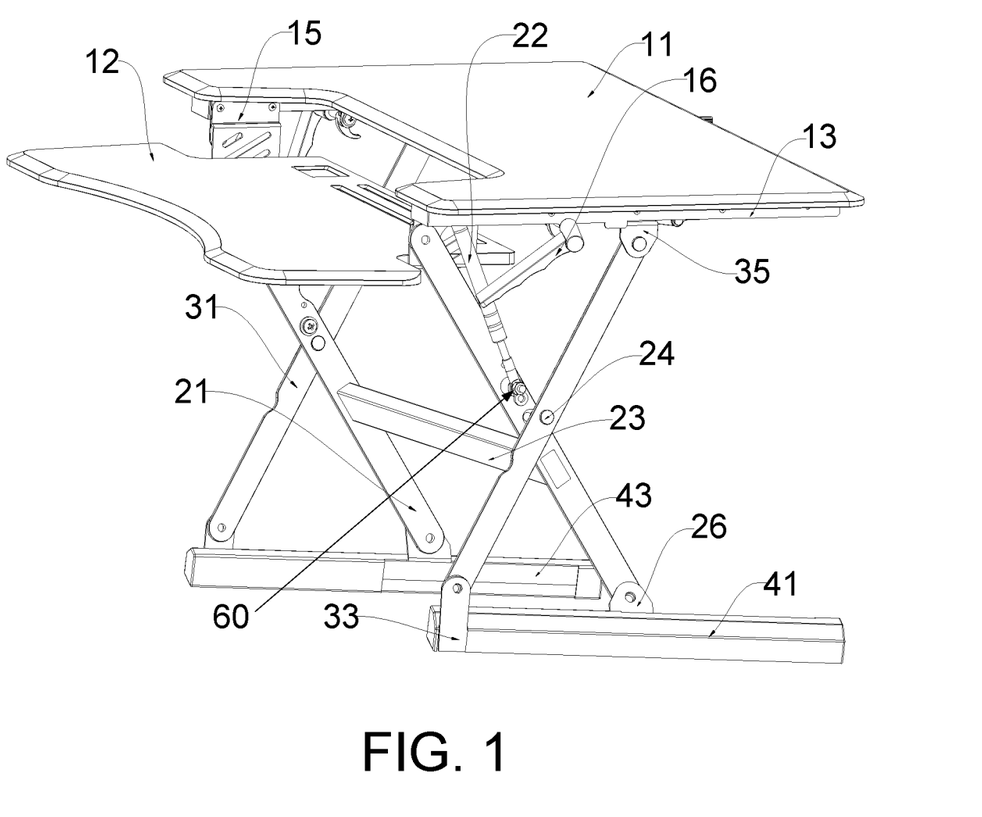
FIG. 1 is a schematic structural diagram of an embodiment.
Figure 2:
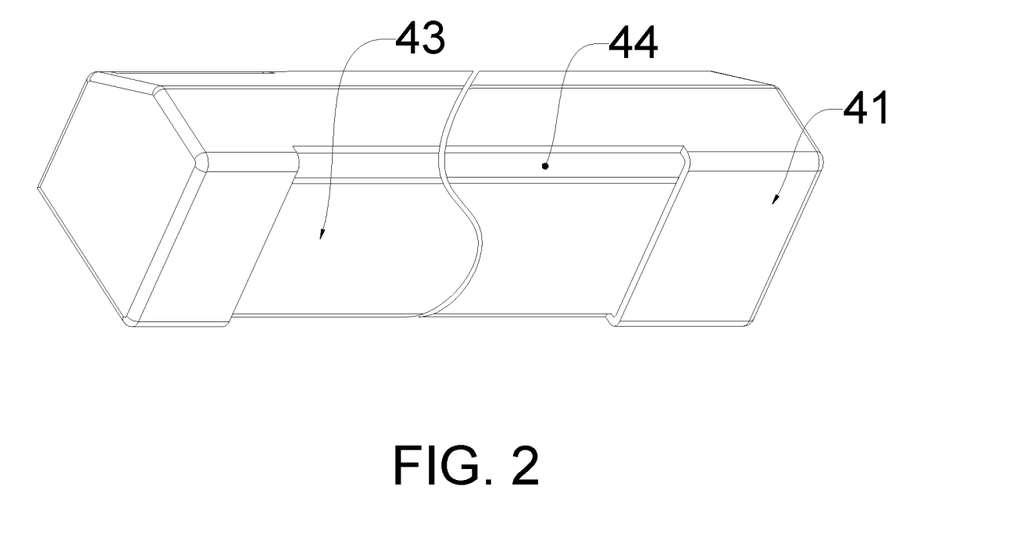
FIG. 2 is a schematic view of the inner side of the base part of the embodiment.
Figure 3:
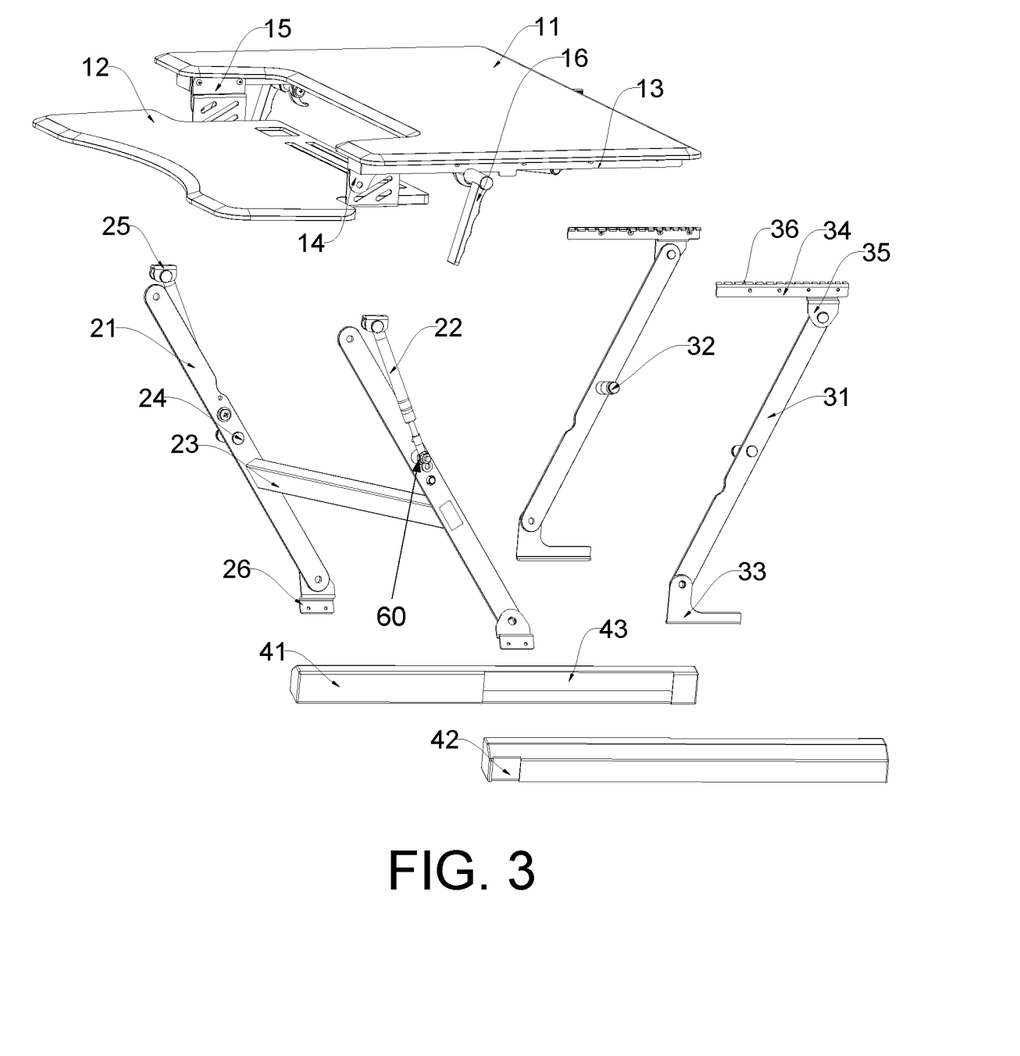
FIG. 3 is an exploded schematic view of the embodiment.
Figure 4:
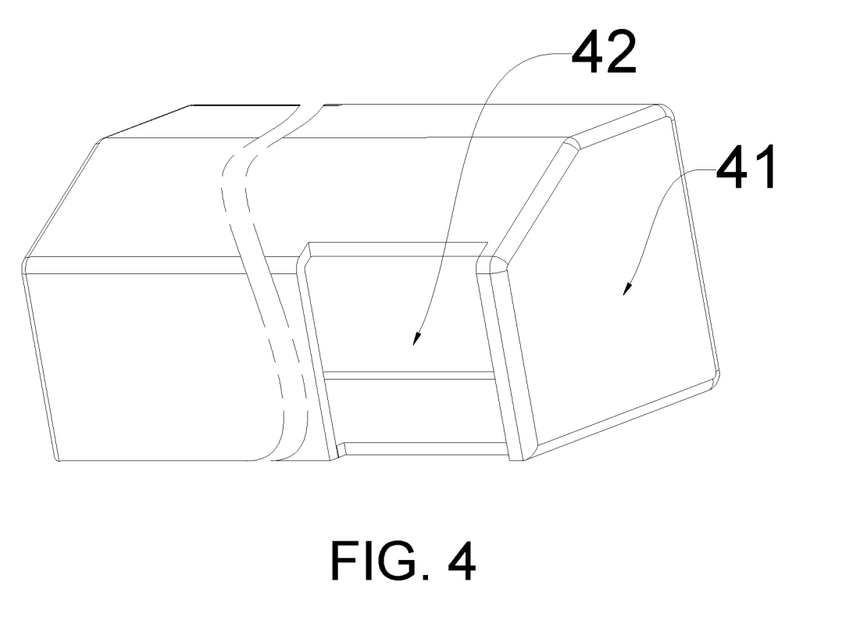
FIG. 4 is a schematic view of the outside of the base part of the embodiment.

As shown in FIG. 3, the rear end (the end close to the keyboard board 12) of the outer side of the base 41 is provided with a plug-in port 42, the bottom end of the second supporting foot 31 is provided with a hinged plug-in board 33, the plug-in board 33 is L-shaped, and the inwardly bent L-shaped extension section of the plug-in board 33 is provided with a bottom baffle 38. The bottom baffle 38 of the L-shaped extension section of the plug-in board 33 is arranged in the plug-in port 42, the bottom baffle 38 of the L-shaped extension section of the plug-in board 33 is embedded into the plug-in port 42, as shown in FIG. 11, and the bottom baffle plate 38 bent at the bottom end of the plug-in board 33 is arranged adjacent to the bottom inner wall of the base 41.

Further, a horizontal supporting frame 23 is arranged between a group of first supporting feet 21 (symmetrically arranged on the base 41) on the left and right sides of the table board 11. The horizontal supporting frame 23 (the frame) is located below the hinge piece 24.

The hinge joint between the bottom end of the supporting telescopic device 22 and the first supporting foot 21 is arranged above the connecting shaft 32 (the longitudinal spacing is higher than the connecting shaft 32). To facilitate the computer table to be folded, the first supporting foot 21 is provided with a hinge piece 24, the hinge piece 24 is matched with the connecting shaft 32, and the first supporting foot 21 and the second supporting foot 31 on the same side are connected by the connecting shaft 32. In other words, the hinge joint between the bottom end of the supporting telescopic device 22 and the first supporting foot 21 are arranged on the outside of the first supporting foot 21, and a horizontal supporting frame 23 is arranged between the first supporting feet 21 on both sides (symmetrically matching a group of first supporting feet 21), the horizontal supporting frame 23 is located below the hinge piece 24, and the hinge piece 24 has a certain distance between the horizontal supporting frame 23 (the hinge piece 24 is higher than the horizontal supporting frame 23), so as to avoid the interference of the horizontal supporting frame 23 to the folded state of the supporting telescopic device 22.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A manual lifting-lowering computer table, comprising: a table board and a keyboard board, wherein the keyboard board is arranged under the table board, sliding seats are arranged on both sides of a bottom surface of the table board, a group of bases parallel to the sliding seats are arranged under the table board, and a first supporting foot and a second supporting foot are arranged on the bases, wherein a middle part of the first supporting foot and a middle part of the second supporting foot are hinged through a connecting shaft, and one ends of the first supporting foot and the second supporting foot away from the bases are arranged on the sliding seats respectively;
   the first supporting foot is provided with a supporting telescopic device, wherein an upper end of the supporting telescopic device is hinged on a connecting seat, and the connecting seat is arranged at one end of the sliding seat adjacent to the keyboard board; a lower end of the supporting telescopic device is arranged on an upper part of the first supporting foot;
   a hinge joint between the lower end of the supporting telescopic device and the first supporting foot is arranged on an outer side of the first supporting foot, the outer side of the first supporting foot faces the second supporting foot, and the hinge joint between the lower end of the supporting telescopic device and the first supporting foot is located between the first supporting foot and the second supporting foot; the hinge joint between the lower end of the supporting telescopic device and the first supporting foot is located above the connecting shaft;
   a side wall of the sliding seat is provided with a handle connecting plate extending downward, an outer side of the sliding seat is provided with a handle, and a top end of the handle is provided with a handle shaft extending laterally inward, wherein the handle shaft is penetrated in the handle connecting plate; one end of the handle shaft away from the handle is provided with a handle shaft support, wherein a top portion of the handle shaft support is provided with a driving strip, and the top portion of the handle shaft support is hinged with an end portion of the driving strip;
   a hinge axis of the handle shaft support and the driving strip is parallel to a connecting axis of the handle shaft and the handle shaft support; one end of the driving strip away from the handle shaft support is provided with a bent clamping piece, and the bent clamping piece is provided with an upper connecting hole and a lower connecting hole that are longitudinally arranged;
   the lower connecting hole of the bent clamping piece is hinged with the driving strip, the upper connecting hole of the bent clamping piece is hinged to an abutment seat, a bending part of the bent clamping piece is arranged in a positioning groove of a clamping block, and the clamping block is arranged in the sliding seat and is hinged with a top end of the second supporting foot.

2. The manual lifting-lowering computer table of claim 1, wherein the supporting telescopic device is an air pressure rod, a gas spring or a spring damper, wherein the clamping block is provided with a bending connection part that is bent outwards with respect to the sliding seat, and the bending connection part of the clamping block is hinged with the top end of the second supporting foot;
   a side of the clamping block away from the bending connection part is provided with the positioning groove extending inward, wherein the positioning groove is arranged in the sliding seat;
   an inner side wall of the sliding seat is provided with a baffle, the clamping block is arranged adjacent to the baffle, and the clamping block is slidably arranged on the baffle.

3. The manual lifting-lowering computer table of claim 1, wherein the hinge joint is located between a bottom end of the supporting telescopic device and the first supporting foot and is arranged above the connecting shaft; the first support foot is provided with a hinge piece, the hinge piece is matched with the connecting shaft, and the first supporting foot and the second supporting foot on a same side are connected by the connecting shaft;
   a horizontal supporting frame is arranged between a group of first supporting feet on left and right sides of the table board, wherein the horizontal supporting frame is located below the hinge piece; a length of the connecting shaft is greater than a width of the supporting telescopic device.

4. The manual lifting-lowering computer table of claim 1, wherein the outer side of the first supporting foot is provided with the supporting telescopic device;
   an upper support frame is arranged between the sliding seats on both sides of the table board, and the sliding seats on both sides of the table board are connected by the upper support frame.

5. The manual lifting-lowering computer table of claim 1, wherein an inner side of the sliding seat adjacent to one end of the keyboard board is provided with a bracket, wherein the bracket is L-shaped, a longitudinal surface of the bracket is arranged on an outer wall of the inner side of the sliding seat, and a lateral surface of the bracket is fixedly connected to a bottom surface of the keyboard board.

6. The manual lifting-lowering computer table of claim 1, wherein the group of bases are arranged under the table board, the middle part of the first supporting foot and the middle part of the second supporting foot are hinged through the connecting shaft, and the first supporting foot and the second supporting foot that are hingedly-connected are arranged on the bases;
   an inner side of the end of the sliding seat adjacent to the keyboard board is provided with a support connection plate extending downward, a top end of the first supporting foot is hinged with the support connection plate, and a bottom end of the first supporting foot is arranged on the base.

7. The manual lifting-lowering computer table of claim 1, wherein a bottom end of the first supporting foot is provided with a bending slider that is hinged, and the bending slider is arranged on the base; an inner side of the base away from the keyboard board is provided with a chute, a bottom portion of the chute of the base is provided with a guide rail plate, and a bottom portion of the bending slider is provided with a bending slider part that is bent outward with respect to the bending slider and extends into the chute of the base and is accommodated in the base, wherein the bending slider part is T-shaped, and the bending slider part of the bending slider is embedded in the chute;

a bottom surface of a bending part of the bending slider part is arranged adjacent to a top end of the guide rail plate, and the bending slider part is slidably arranged in the chute.

8. The manual lifting-lowering computer table of claim 1, wherein a rear end of an outer side of the base is provided with a plug-in port, the outer side of the base faces away from the first supporting foot, a bottom end of the second supporting foot is provided with a hinged plug-in board, the plug-in board is L-shaped, an L shaped extension section of the plug-in board is provided with a bottom baffle, and the L-shaped extension section of the plug-in board is inwardly bent toward the first supporting foot, wherein the bottom baffle of the L-shaped extension section of the plug-in board is arranged in the plug-in port, the bottom baffle of the L-shaped extension section of the plug-in board is embedded into the plug-in port, and the bottom baffle plate bent at a bottom end of the plug-in board is arranged adjacent to a bottom inner wall of the base.

\* \* \* \* \*